United States Patent
Endo et al.

(10) Patent No.: US 11,981,787 B2
(45) Date of Patent: May 14, 2024

(54) LAMINATED FOAM SHEET

(71) Applicant: SEKISUI KASEI CO., LTD., Osaka (JP)

(72) Inventors: Shota Endo, Osaka (JP); Eiji Fukuyama, Osaka (JP); Ayano Mori, Osaka (JP)

(73) Assignee: SEKISUI KASEI CO., LTD., Osaka (JP)

( * ) Notice: Subject to any disclaimer, the term of this patent is extended or adjusted under 35 U.S.C. 154(b) by 339 days.

(21) Appl. No.: 17/433,364

(22) PCT Filed: Mar. 25, 2020

(86) PCT No.: PCT/IB2020/052782
§ 371 (c)(1),
(2) Date: Aug. 24, 2021

(87) PCT Pub. No.: WO2020/194198
PCT Pub. Date: Oct. 1, 2020

(65) Prior Publication Data
US 2022/0145035 A1    May 12, 2022

(30) Foreign Application Priority Data
Mar. 28, 2019 (JP) .................. 2019-064179

(51) Int. Cl.
*B32B 5/18*    (2006.01)
*B32B 27/06*   (2006.01)
(Continued)

(52) U.S. Cl.
CPC ............ *C08J 9/141* (2013.01); *B32B 5/18* (2013.01); *B32B 27/065* (2013.01); *B32B 27/36* (2013.01);
(Continued)

(58) Field of Classification Search
CPC .................... B32B 27/065; B32B 27/36
See application file for complete search history.

(56) References Cited

U.S. PATENT DOCUMENTS

| 7,265,160 B2 | 9/2007 | Oka et al. |
| 2005/0032923 A1 | 2/2005 | Oka et al. |

(Continued)

FOREIGN PATENT DOCUMENTS

| CN | 1596279 A | 3/2005 |
| CN | 101035677 A | 9/2007 |

(Continued)

OTHER PUBLICATIONS

JP 2005-154604 Machine Translation (Year: 2005).*
(Continued)

*Primary Examiner* — Zachary M Davis
(74) *Attorney, Agent, or Firm* — GREENBLUM & BERNSTEIN, P.L.C.

(57) ABSTRACT

The present invention provides a laminated expanded sheet excellent in strength and formability. More specifically, the present invention relates to a laminated expanded sheet comprising a laminate of a resin expanded layer and a resin non-expanded layer, wherein the resin expanded layer is provided as an outermost layer, the laminated expanded sheet has a bending strength of 5 MPa or more, and an arithmetic average roughness of a surface formed of the resin expanded layer is 3 μm or more and 10 μm or less.

4 Claims, 1 Drawing Sheet

(51) Int. Cl.
*B32B 27/36* (2006.01)
*C08J 9/14* (2006.01)

(52) U.S. Cl.
CPC ... *B32B 2266/0264* (2013.01); *B32B 2266/06* (2013.01); *B32B 2307/538* (2013.01); *B32B 2307/546* (2013.01); *B32B 2307/7163* (2013.01); *B32B 2307/732* (2013.01); *C08J 2367/02* (2013.01)

(56) References Cited

U.S. PATENT DOCUMENTS

| | | |
|---|---|---|
| 2010/0028654 A1 | 2/2010 | Takase et al. |
| 2018/0297335 A1 | 10/2018 | Huh et al. |
| 2018/0304573 A1 | 10/2018 | Tokunaga et al. |

FOREIGN PATENT DOCUMENTS

| | | |
|---|---|---|
| JP | H08-157623 | 6/1996 |
| JP | 2002-036337 A | 2/2002 |
| JP | 2005-154604 A | 6/2005 |
| JP | 2009-091588 | 4/2009 |
| JP | 2011-098509 | 5/2011 |
| JP | 2014-080022 | 5/2014 |
| JP | 2016-188301 | 11/2016 |
| JP | 2017-052910 | 3/2017 |
| JP | 2019-064073 | 4/2019 |
| JP | 2019-064076 | 4/2019 |
| WO | 2017/069127 | 4/2017 |

OTHER PUBLICATIONS

JP 2014-080022 Machine Translation (Year: 2014).*
Office Action issued in CN Patent Application No. 202080017906.8, Apr. 14, 2023, translation.
Office Action issued in KR Patent Application No. 10-2021-7027120, May 30, 2023, translation.
Office Action issued in TW Patent Application No. 109109633, Apr. 6, 2021, English translation.
ISR issued in WIPO Patent Application No. PCT/IB2020/052782, Jun. 30, 2020, English translation.
Written Opinion issued in WIPO Patent Application No. PCT/IB2020/052782, Jun. 30, 2020, English translation.
Notice of Allowance issued in TW Patent Application No. 109109633, Sep. 27, 2021, English summary.
Office Action issued in CN Patent Application No. 202080017906.8, Sep. 27, 2022, translation.
Office Action issued in KR Patent Application No. 10-2021-7027120, Nov. 26, 2022, translation.
Office Action issued in CN Patent Application No. 202080017906.8, Aug. 17, 2023, translation.
Office Action issued in CN Patent Application No. 202080017906.8, Nov. 20, 2023, translation.
Notice of Allowance dated Dec. 28, 2023 issued in Korean patent application No. 10-2021-7027120, with English translation thereof.

* cited by examiner

LAMINATED FOAM SHEET

CROSS REFERENCE TO RELATED APPLICATION

This Application is a 371 of PCT/IB2020/052782 filed on Mar. 25, 2020, which, in turn, claimed the priority of Japanese Patent Application No. 2019-064179 filed on Mar. 28, 2019, the contents of which are incorporated herein by reference.

TECHNICAL FIELD

The present invention relates to a laminated expanded sheet, and more particularly relates to a laminated expanded sheet in which a resin expanded layer and a resin non-expanded layer are laminated.

BACKGROUND TECHNOLOGY

Conventionally, since a molded article obtained by thermally forming a resin expanded sheet to impart a three-dimensional shape thereto is excellent in lightness and heat insulating property, it is utilized in various applications.

In addition, since a laminated expanded sheet in which a resin film is laminated on one side or both sides of a resin expanded sheet has a resin expanded layer formed of a resin expanded sheet, and has, on the surface thereof, a resin non-expanded layer formed of a resin film, the laminated expanded sheet is widely used as a forming material of a molded article having a high strength as compared with a molded article made of a resin expanded sheet.

For example, a tray or a cup obtained by thermally forming a laminated expanded sheet is widely used as a food container in commodity display in supermarkets or convenience stores.

DOCUMENTS OF RELATED ART

Patent Document

Patent Document 1: Japanese Domestic Re-Publication of PCT International Application WO 2017/069127

SUMMARY OF THE INVENTION

Problem to be Solved by the Invention

This kind of a laminated expanded sheet is required to have not only excellent strength but also excellent thermoformability, but situations are that such a demand has not been sufficiently satisfied yet.

Therefore, an object of the present invention is to provide a laminated expanded sheet excellent in formability.

Means for Solving the Problem

In order to solve the above-mentioned problems, the present inventors have made intensive studies, and found out that by making a laminated expanded sheet have a predetermined surface roughness, the problems as described above are solved, resulting in completion of the present invention.

That is, the present invention for solving the above-mentioned problems provides a laminated expanded sheet comprising a laminate of a resin expanded layer and a resin non-expanded layer, wherein the resin expanded layer is provided as an outermost layer, the laminated expanded sheet has a bending strength of 5 MPa or more, and an arithmetic average roughness of a surface formed of the resin expanded layer is 3 μm or more and 10 μm or less.

Effects of Invention

According to the present invention, a laminated expanded sheet excellent in strength and formability can be provided.

BEST MODE FOR CARRYING OUT THE INVENTION

Figure 1:
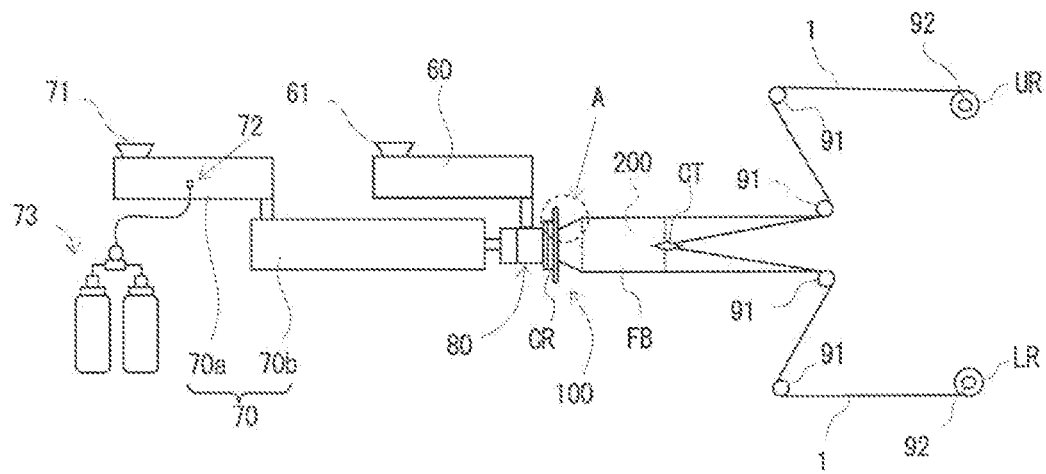
FIG. 1 is a schematic view showing a configuration of an apparatus for producing a biodegradable laminated expanded sheet.
Figure 2:
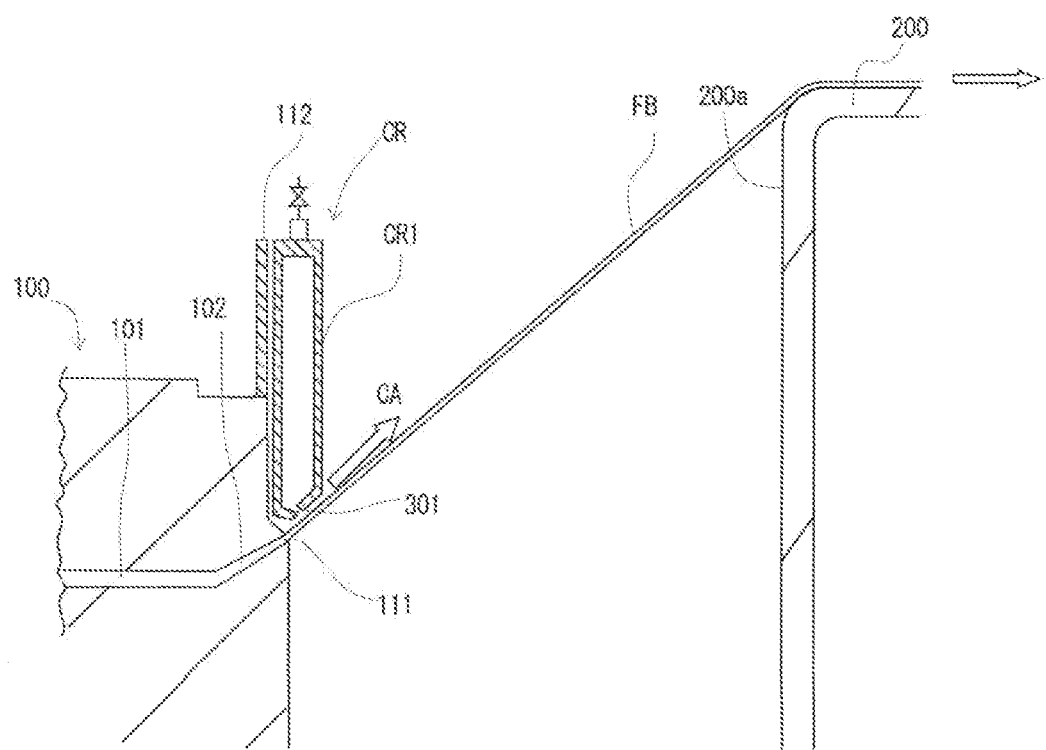
FIG. 2 is a schematic end view showing a part shown with a broken line A in FIG. 1.

Embodiments of the present invention will be described below.

First, extrusion equipment used in a method for producing a laminated expanded sheet of the present embodiment will be described.

In addition, below, as the laminated expanded sheet of the present invention, a biodegradable laminated expanded sheet containing a biodegradable resin as a main component is exemplified.

A biodegradable laminated expanded sheet of the present embodiment has a two-layer structure of a biodegradable resin expanded layer and a biodegradable resin non-expanded layer, and is prepared by a coextrusion method.

For producing the biodegradable laminated expanded sheet of the present embodiment, equipment including a first extrusion line 6 (not shown with a symbol) for forming a biodegradable resin non-expanded layer, and a second extrusion line 7 (not shown with a symbol) for forming a biodegradable resin expanded layer is utilized.

The above-mentioned first extrusion line 6 includes a single extruder 60 for melting and kneading a non-expandable resin composition for forming a biodegradable resin non-expanded layer.

The above-mentioned second extrusion line 7 includes a tandem extruder 70 as an extruder for melting and kneading an expandable resin composition containing a biodegradable resin and a blowing agent.

The extruder 60 of the above-mentioned first extrusion line 6 has a hopper 61 for putting a forming material (non-expandable resin composition) of the above-mentioned biodegradable resin non-expanded layer, and it is configured so as to melt and knead a non-expandable resin composition inside thereof, and discharge a melted and kneaded product obtained by the melting and kneading.

The above-mentioned tandem extruder 70 is configured such that two extruders of an upstream extruder 70a and a downstream extruder 70b are connected, and in the upstream extruder 70a, a hopper 71 for putting a forming material of a biodegradable resin expanded layer, and a gas introduction part 72 for supplying a blowing agent such as a hydrocarbon from a gas supply device 73 into a cylinder are provided.

The above-mentioned downstream extruder 70b is configured so as to discharge the melted and kneaded product obtained by further melting and kneading an expandable resin composition in a molten state, which has been formed in the above-mentioned upstream extruder 70*a*.

At a tip part of the above-mentioned tandem extruder 70, a joining die 80 that joins the above-mentioned expandable resin composition that has been melted and kneaded with the tandem extruder 70 and a non-expandable resin composition that has been melted and kneaded with the extruder 60 of the above-mentioned first extrusion line 6, and a circular die 100 having an annular discharge port (hereinafter, also referred to as "die slit 111") for extrusion expanding the joined resin compositions in the molten state into the atmospheric air to form a cylindrical expanded sheet FB are mounted.

The above-mentioned joining die 80 is configured so as to pass the above-mentioned expandable resin composition and the above-mentioned non-expandable resin composition in a predetermined state through the above-mentioned circular die 100 provided with a cylindrical resin passage 101 for drawing along an extrusion direction.

Specifically, the above-mentioned joining die 80 is configured so that internal and external two-layer cylindrical streams in which an internal side is the above-mentioned expandable resin composition, and an external side is the above-mentioned non-expandable resin composition are formed in the above-mentioned resin passage 101.

The above-mentioned extrusion equipment is provided with a cooling mandrel 200 for cooling, from an internal surface side, the above-mentioned cylindrical expanded sheet FB that has been discharged in a cylindrical shape from the above-mentioned annular die slit 111 opening on a front surface of the circular die 100.

The above-mentioned extrusion equipment is further provided with a cooling device CR for cooling the above-mentioned cylindrical expanded sheet from an external side by blowing wind to an expanded sheet (cylindrical expanded sheet) before being cooled with the above-mentioned cooling mandrel 200, from an external side.

On a downstream side of the above-mentioned cooling mandrel 200, a cutting blade CT for making one left and right pair of notches on the cylindrical expanded sheet FB is attached.

The extrusion equipment in the present embodiment is provided with a roller 91 for developing cylindrical expanded sheets FB that have been split into two upper and lower parts by cutting with the above-mentioned cutting blade CT along the extrusion direction, into flat sheets, respectively, and a wind-up roller 92 for winding this developed biodegradable laminated expanded sheet 1 as two web rolls of an upper roll UR and a lower roll LR.

In the present embodiment, the above-mentioned cooling device CR for cooling the above-mentioned cylindrical expanded sheet FB from an external side, from the above-mentioned circular die 100 to the above-mentioned cooling mandrel 200, has a cooling ring CR1 that is a flat doughnut-like hollow plate.

In the cooling ring CR1, the internal circumference thereof is a round shape having a slightly larger diameter than that of the above-mentioned die slit 111, a blowout port 301 for blowing out air is formed on an internal circumferential part, and the blowout port 301 is formed annularly along an internal circumferential edge of the above-mentioned cooling ring CR1.

In the cooling ring CR1, since the blowout port 301 is opened along an internal circumference as described above, the blowout port 301 is opened on an external side of the above-mentioned die slit 111 spaced apart by a slight distance, and the above-mentioned cooling mechanism is configured so as to blow wind to the cylindrical expanded sheet FB immediately after being extruded.

The biodegradable laminated expanded sheet of the present embodiment is prepared using the equipment as described above, by a coextrusion method in which a biodegradable resin expanded layer and a biodegradable resin non-expanded layer are extruded from the above-mentioned die slit 111 simultaneously.

A method of preparing the biodegradable laminated expanded sheet of the present embodiment is not limited to a coextrusion method, but such a sheet may be prepared by preparing a biodegradable resin expanded sheet of a single resin expanded layer by an extrusion expansion method, and thereafter, laminating a biodegradable resin film on the biodegradable resin expanded sheet so as to make the above-mentioned biodegradable resin expanded sheet constitute a resin expanded layer, and at the same time, make the above-mentioned biodegradable resin film constitute a resin non-expanded layer.

The above-mentioned biodegradable laminated expanded sheet has a two-layer structure in which a biodegradable resin expanded layer and a biodegradable resin non-expanded layer are laminated.

That is, the biodegradable laminated expanded sheet of the present embodiment is configured such that the above-mentioned biodegradable resin non-expanded layer is provided as one outermost layer, and the above-mentioned biodegradable resin expanded layer is provided as the other outermost layer.

The biodegradable laminated expanded sheet of the present embodiment may have a three or more-layer laminated structure, in which one or more intermediate layers are provided between outermost layers.

The biodegradable laminated expanded sheet of the present embodiment can have excellent strength by having not only a biodegradable resin expanded layer but also a biodegradable resin non-expanded layer.

In order to make a molded article exert excellent strength, it is preferable that the biodegradable laminated expanded sheet prepared as described above has a bending strength of 5 MPa or more.

The bending strength of the biodegradable laminated expanded sheet is preferably 10 MPa or less, more preferably 8 MPa or less.

A bending elasticity of the biodegradable laminated expanded sheet of the present embodiment is preferably 120 MPa or more, more preferably 150 MPa or more, further preferably 180 MPa or more.

The bending elasticity of the biodegradable laminated expanded sheet is preferably 500 MPa or less, more preferably 350 MPa or less, further preferably 270 MPa or less.

The bending strength and the bending elasticity of the biodegradable laminated expanded sheet can be obtained, for example, as follows:

<Bending Strength Measurement>

Using a universal testing machine "Tensilon UCT-10T" manufactured by ORIENTEC CO., LTD. and a universal testing machine data processing "UTPS-458X" manufactured by SOFTBRAIN Co., Ltd., measurement is performed under the test piece size of width 50 mm×length 150 mm, a compression rate of 200 mm/min, a pressurizing wedge 3.2R, a supporting base 3.2R, and an inter-fulcrums distance of 100 mm.

The number of test pieces is 5, and five test results are averaged to obtain the bending elasticity.

A starting point of displacement is employed as a turning point, and the bending strength and the bending elasticity are obtained.

(Bending Strength)

The bending strength R (MPa) is calculated by the following equation:

$$R = (1.5 F_R \times L / bd^2) \times 10^3$$

$F_R$: maximum load (kN)
L: inter-fulcrums distance (mm)
b: width of test piece (mm)
d: thickness of test piece (mm)

(Bending Elasticity)

The bending elasticity E (MPa) is calculated by the following equation:

$$E = \alpha L^3 / (4bd^3)$$

α: Elasticity gradient (N/mm)

In the above-mentioned bending strength measurement, a test that is performed so that a pressuring wedge touches one surface side (for example, resin expanded layer side) of a laminated expanded sheet, and a test that is performed so that a pressuring wedge touches the other surface side (for example, resin non-expanded layer side) of a laminated expanded sheet are carried out five times, respectively, and an arithmatic average value of the measurement results of 10 points is obtained.

That is, the above-mentioned bending strength and the above-mentioned bending elasticity are obtained as an arithmetic average value of measured values of 10 points.

Since the biodegradable laminated expanded sheet in the present embodiment has the high bending elasticity, upon thermoforming, unless the sheet is heated so as to become a sufficiently softened state, a shape of a forming die may not be sufficiently accurately reflected to a molded article.

However, if the biodegradable laminated expanded sheet is sufficiently softened, at thermoforming, the biodegradable laminated expanded sheet adheres to a forming surface of a forming die, suitable "sliding" is not generated between the forming surface and the biodegradable laminated expanded sheet, and the formability in a molded article may be rather deteriorated.

In the biodegradable laminated expanded sheet of the present embodiment, provision of the above-mentioned biodegradable resin expanded layer as an outermost layer in a predetermined state becomes an important requirement for making the biodegradable laminated expanded sheet exert good formability.

Specifically, in the above-mentioned biodegradable laminated expanded sheet, it is important that the arithmetic average roughness (hereinafter, also referred to as "surface roughness (Ra)") of the surface formed of the above-mentioned biodegradable resin expanded layer is 3 μm or more and 10 μm or less.

From this, excessive adherence of the biodegradable laminated expanded sheet to a forming surface can be suppressed at thermoforming.

In addition, the excessive roughness of the above-mentioned surface roughness is not preferable, and the above-mentioned surface roughness is preferably 6 μm or less, more preferably 5 μm or less.

The surface roughness (arithmetic average roughness: Ra) of the above-mentioned biodegradable laminated expanded sheet is measured in accordance with JIS B0601 "Definitions and Indications of Surface Roughness".

That is, after the biodegradable laminated expanded sheet is conditioned for 16 hours under the standard atmosphere of JIS K7100: 1999, symbol "23/50" (temperature 23° C., relative humidity 50%), class 2, the surface roughness is measured under the following device and measurement conditions.

(Measurement Conditions)
Device: HANDYSURF E-35A manufactured by TOKYO SEIMITSU CO., LTD.
Cutoff value (λc): 0.80 mm
Assessment length (L): 4.0 mm In addition, measurement is performed toward a TD direction (direction orthogonal to extrusion direction, width direction) of the biodegradable laminated expanded sheet, and performed at randomly selected five places.

The arithmetic average roughness Ra of the biodegradable laminated expanded sheet is an average of their arithmetic average roughness Ra.

In order to form the surface roughness as described above on the surface of the biodegradable resin expanded layer, a cell film constituting the surface of the biodegradable resin expanded layer may be swollen for every cell.

In order to attain such a state, it is preferable that quite a lot of a blowing agent is blended when melting and kneading are performed with the above-mentioned tandem extruder 70.

In addition, in order to form the surface roughness as described above on the surface of the biodegradable resin expanded layer, it is also effective to strengthen cooling on a side (external side) on which the biodegradable resin non-expanded layer is provided with the above-mentioned cylindrical expanded sheet FB, and suppress dissipation of a blowing agent gas from the biodegradable resin non-expanded layer side.

A thickness of the biodegradable laminated expanded sheet is preferably 0.2 mm or more, more preferably 0.5 mm or more, further preferably 1.0 mm or more.

A thickness of the above-mentioned biodegradable laminated expanded sheet is preferably 6 mm or less, more preferably 5 mm or less, further preferably 4 mm or less.

A thickness of the above-mentioned biodegradable laminated expanded sheet can be obtained, for example, as an average of thicknesses measured at measurement points of randomly selected 10 or more places.

A thickness of a biodegradable resin non-expanded layer of the biodegradable laminated expanded sheet can be a thickness of 1 μm or more and 200 μm or less.

A thickness of the biodegradable resin non-expanded layer can be obtained by taking a microphotograph of a cross section of the biodegradable resin non-expanded layer (cross section in a plane orthogonal to a plane direction of the biodegradable laminated expanded sheet), and calculating an arithmetic average value of measured values obtained by measuring a thickness of the biodegradable resin non-expanded layer at randomly selected plural places (for example, 10 places) in the photograph.

A basis weight of the above-mentioned biodegradable laminated expanded sheet is preferably 200 g/m² or more, more preferably 250 g/m² or more, further preferably 300 g/m² or more.

The basis weight of the above-mentioned biodegradable laminated expanded sheet is preferably 800 g/m² or less, more preferably 700 g/m² or less.

The basis weight of the above-mentioned biodegradable laminated expanded sheet is obtained, for example, from the following equation, by excising a plurality of (for example, 10) samples of 100 cm² or more, and measuring the mass and the area of each of the samples.

Basis weight(g/m$^2$)=10,000×test piece mass(g)/test piece area(cm$^2$)

A density (apparent density) of the biodegradable laminated expanded sheet as described above is not particularly limited, but is preferably 200 kg/m$^3$ or more, more preferably 300 kg/m$^3$ or more.

The apparent density is preferably 1,000 kg/m$^3$ or less, more preferably 900 kg/m$^3$ or less, further preferably 800 kg/m$^3$ or less.

The apparent density of the biodegradable laminated expanded sheet can be obtained by a method described in JIS K7222: 1999 "Cellular plastics and rubbers—Determination of apparent density", and specifically, is measured by the method as described below.

(Method of Measuring Apparent Density)

A sample of 100 cm$^3$ or more is cut from the biodegradable laminated expanded sheet so as not to change the original cell structure, this sample is conditioned for 16 hours under the standard atmosphere of JIS K7100: 1999, symbol "23/50" (temperature 23° C., relative humidity 50%), class 2, thereafter, the dimension and the mass thereof are measured, and the density is calculated by the following equation:

Apparent density(kg/m$^3$)=mass of sample(kg)/volume of sample(m$^3$)

In addition, for measuring the dimension of the sample, for example, "DIGIMATIC" type CD-15 manufactured by Mitutoyo Corporation can be used.

In order to exert good formability, the above-mentioned biodegradable laminated expanded sheet has an open cell ratio of preferably 25% or less, more preferably 20% or less, further preferably 15% or less.

The open cell ratio is usually 1% or more.

An open cell ratio of the above-mentioned biodegradable laminated expanded sheet is measured as follows:
<Open Cell Ratio of Biodegradable Laminated Expanded Sheet>

A plurality of 25 mm length and 25 mm width sheet-like samples are excised from the biodegradable laminated expanded sheet, excised samples are overlapped so as not to form gaps, to obtain a measurement sample having a thickness of 25 mm, the external dimension of this measurement sample is measured to 1/100 mm using "DIGIMATIC CALIPER" manufactured by Mitutoyo Corporation, and the apparent volume (cm$^3$) is obtained.

Then, the volume (cm$^3$) of a measurement sample is obtained by the 1-1/2-1 atm method using an air comparison pycnometer type 1000 (manufactured by Tokyo Science Co., Ltd.).

By these obtained values and the following equation, an open cell ratio (%) is calculated, and an average of the number of tests (5 times) is obtained.

In addition, after the measurement sample is conditioned for 16 hours under the standard atmosphere of JIS K7100-1999, symbol "23/50" (temperature 23° C., relative humidity 50%), class 2, measurement is performed under the same standard atmosphere.

In addition, the air comparison pycnometer is corrected with a standard sphere (large 28.9 cc, small 8.5 cc).

Open cell ratio (%)=(apparent volume−volume measured with air comparison pycnometer)/apparent volume×100

An average cell diameter of the above-mentioned biodegradable laminated expanded sheet is preferably 0.7 mm or less, more preferably 0.6 mm or less.

The above-mentioned average cell diameter is usually 0.1 mm or more.

An average cell diameter of the above-mentioned biodegradable laminated expanded sheet is measured as follows:
<Average Cell Diameter of Biodegradable Laminated Expanded Sheet>

A cross section that has been excised vertical to the surface of the biodegradable laminated expanded sheet along an MD direction (extrusion direction) and a TD direction (width direction) from a width direction central part of the biodegradable laminated expanded sheet is magnified to 100 times, and photographed using a scanning electron microscope "SU1510" manufactured by Hitachi High-Technologies Corporation.

Thereupon, a microscopic image is photographed so that a predetermined magnification is obtained when printed on one A4 landscape format paper in the state where two longitudinal and transverse images (total 4 images) are arranged.

Specifically, a photographing magnification with an electron microscope is adjusted so that when a 60 mm arbitrary straight line parallel with each direction of MD and TD, and a 60 mm straight line in a direction (thickness direction, also referred to as VD direction) orthogonal to each direction are drawn on the image printed as described above, the number of cells present on this straight line becomes around 3 to 10.

For each of a cross section that has been cut along the MD direction (hereinafter, referred to as "MD cross section") and a cross section that has been cut along the TD direction (hereinafter, referred to as "TD cross section"), microscopic images of each two fields, a total of 4 fields, are photographed and printed on an A4 paper as described above.

Three arbitrary straight lines (length 60 mm) parallel with the MD direction are drawn on each of two images of the MD cross section, and at the same time, three arbitrary straight lines (length 60 mm) parallel with the TD direction are drawn on each of two images of the TD cross section.

In addition, three straight lines (60 mm) parallel with the VD direction are drawn on one image of the MD cross section and one image of the TD cross section, and every six 60 mm arbitrary straight lines parallel with the MD direction, the TD direction, and the VD direction are drawn for every direction.

In addition, arbitrary straight lines are such that a cell is contacted only at a contact point as less as possible, and when contacted, this cell is also added as the cell number.

Cell numbers D counted regarding six arbitrary straight line for each direction of the MD direction, the TD direction, and the VD direction are arithmetically averaged, and this is employed as the cell number for each direction.

From an image magnification at which the cell number was counted, and this cell number, an average chord length t of a cell is calculated by the following equation:

Average chord length $t$(mm)=60/(cell number×image magnification)

A scale bar on an image is measured to 1/100 mm with "DIGIMATIC CALIPER" manufactured by Mitutoyo Corporation, and an image magnification is obtained by the following equation:

Image magnification=scale bar experimental value (mm)/indicated value of scale bar(mm)

Then, a cell diameter in each direction is calculated by the following equation:

Cell diameter $D$(mm)=$t$/0.616

Further, a cubic root of a product of these values is employed as an average cell diameter.

Average cell diameter(mm)=$(D_{MD} \times D_{TD} \times D_{VD})^{1/3}$ $D_{MD}$: cell diameter in MD direction (mm)
$D_{TD}$: cell diameter in TD direction (mm)
$D_{VD}$: cell diameter in VD direction (mm)

The biodegradable laminated expanded sheet of the present embodiment can be formed from a resin composition containing a biodegradable resin as a main component as described above.

Hereinafter, a resin composition used in formation of the above-mentioned resin blowing agent layer will be described.

A resin composition constituting the above-mentioned resin non-expanded layer can be the same as a resin composition exemplified below, except that a blowing agent is not contained.

The above-mentioned resin composition of the present embodiment may be, for example, one containing only a biodegradable resin, or may be one containing a biodegradable resin and an additive and the like.

Examples of the biodegradable resin of the present embodiment include a biodegradable polyester-based resin.

Examples of the biodegradable polyester-based resin include, for example, an aliphatic polyester-based resin obtained by polycondensation of glycol and aliphatic dicarboxylic acid, and the like, and it is suitable that a dicarboxylic acid and a diol are constituent units.

Examples of the aliphatic polyester-based resin include, for example, polyethylene succinate, polybutylene succinate, polyhexamethylene succinate, polyethylene adipate, polyhexamethylene adipate, polybutylene adipate, polyethylene oxalate, polybutylene oxalate, polyneopentyl oxalate, polyethylene sebacate, polybutylene sebacate, polyhexamethylene sebacate, polybutylene succinate adipate, polybutylene succinate carbonate, and the like.

The biodegradable polyester-based resin of the present embodiment may be, for example, an aliphatic polyester-based resin such as poly(α-hydroxyacid) such as polyglycolic acid and polylactic acid, or a copolymer thereof, poly(ω-hydroxyalkanoate) such as poly(ε-caprolactone) and poly(β-propiolactone), poly(β-hydroxyalkanoate) such as poly(3-hydroxybutyrate), poly(3-hydroxyvalerate), poly(3-hydroxycaproate), poly(3-hydroxyheptanoate), and poly(3-hydroxyoctanoate), and poly(4-hydroxybutyrate).

As the above-mentioned biodegradable polyester-based resin, one having no long chain branch is preferable. From a viewpoint of biodegradability, the biodegradable polyester-based resin of the present embodiment is preferably an aliphatic polyester-based resin.

When an amount of all biodegradable polyester-based resins contained in the above-mentioned resin composition is 100% by mass, a ratio of the aliphatic polyester-based resin is preferably 85% by mass or more, more preferably 90% by mass or more, further preferably 95% by mass or more.

It is especially preferable that all biodegradable polyester-based resins contained in the above-mentioned resin composition are an aliphatic polyester-based resin.

The biodegradable polyester-based resin used in the present embodiment is particularly preferably polybutylene succinate, among these.

When an amount of all biodegradable polyester-based resins contained in the above-mentioned resin composition is 100% by mass, a ratio of polybutylene succinate is preferably 85% by mass or more, more preferably 90% by mass or more, further preferably 95% by mass or more.

It is especially preferable that all biodegradable polyester-based resins contained in the above-mentioned resin composition are polybutylene succinate.

In addition, in the present embodiment, among the above-exemplified biodegradable aliphatic polyester-based resins, one kind may be used by selecting it, and among the above-exemplified biodegradable aliphatic polyester-based resins, a plurality of kinds may be used by mixing them, or a biodegradable aliphatic polyester-based resin other than the above-exemplified ones may be used.

Examples of an additive contained in the above-mentioned resin composition include polymers other than a biodegradable resin, inorganic substances such as an inorganic filler, various rubber/plastic chemicals, and the like.

Examples of the polymer that can be contained in the above-mentioned resin composition, in addition to the biodegradable resin, include polymer antistatic agents, fluorine-based resins used as a cell adjusting agent, rubber-based modifiers, and the like.

In order to make the biodegradable laminated expanded sheet exert excellent biodegradability, a ratio of the biodegradable resin occupied in all polymers contained in the resin composition is preferably 85% by mass or more, more preferably 90% by mass or more, further preferably 95% by mass or more.

In order to make the biodegradable laminated expanded sheet exert excellent biodegradability, a ratio of the biodegradable polyester-based resin occupied in all biodegradable resins contained in the resin composition is preferably 85% by mass or more, more preferably 90% by mass or more, further preferably 95% by mass or more.

The above-mentioned resin composition can arbitrarily contain an additive such as a shrinkage preventing agent, for the purpose of further improving the expansion formability thereof.

It is preferable that the content of the additive is in a range of 0.05 part by mass or more and 5 parts by mass or less, based on 100 parts by mass of the biodegradable resin.

Examples of the above-mentioned shrinkage preventing agent include, for example, higher alkylamine, fatty acid amide, a complete ester of higher fatty acid, and the like, in addition to ester compounds of a polyhydric alcohol and a higher fatty acid such as lauric acid monoglyceride, palmitic acid monoglyceride, stearic acid monoglyceride, pentaerythrite monocaprate, pentaerythrite monooleate, pentaerythrite monolaurate, dipentaerythrite distearate, sorbitan monooleate, sorbitan sesquisaccharide oil fatty acid ester, sorbitan monopalmitate, sorbitan monolaurate, sorbitan monostearate, mannitan monooleate, and mannitan monolaurate.

As the shrinkage preventing agent, among the above-exemplified ones, one kind may be used by selecting it, among the above-exemplified shrinkage preventing agents, a plurality of kinds may be used by mixing them, and as a shrinkage preventing agent other than the above-mentioned exemplified ones, the known one may be used.

Among them, stearic acid monoglyceride is particularly preferable.

In the above-mentioned resin composition, a generally used cell adjusting agent can be used for the purpose of forming a good cell structure at expansion.

Examples of the cell adjusting agent include, for example, a fine powder of a fluorine-based resin such as polytetrafluoroethylene, talc, aluminum hydroxide, silica, and the like.

A decomposable blowing agent that will be further described later can adjust the expanded state by joint use with a volatile blowing agent, and can also be used as a cell adjusting agent.

A blowing agent used in the above-mentioned resin composition is not particularly limited as long as it is used in normal extrusion expansion, a volatile blowing agent that becomes a gas at an ambient temperature (23° C.) and an ambient pressure (1 atm), and a decomposable blowing agent that generates the gas by thermal decomposition can be employed, and as the above-mentioned volatile blowing agent, for example, an inert gas, an aliphatic hydrocarbon, an alicyclic hydrocarbon, and the like can be employed.

Examples of the above-mentioned inert gas include, for example, carbon dioxide, nitrogen, and the like, examples of the aliphatic hydrocarbon include for example, propane, normal butane, isobutane, normal pentane, isopentane, and the like, and examples of the above-mentioned alicyclic hydrocarbon include, for example, cyclopentane. cyclohexane, and the like.

The content of the above-mentioned blowing agent is preferably 0.1 part by mass or more, more preferably 0.3 part by mass or more, particularly preferably 0.6 part by mass or more, based on 100 parts by mass of the biodegradable resin contained in the above-mentioned resin composition.

The content of the above-mentioned blowing agent is preferably 2 parts by mass or less, more preferably 1.5 parts by mass or less, further preferably 1.2 parts by mass or less.

Examples of the above-mentioned decomposable blowing agent include azodicarbonamide, dinitrosopentamethylenetetramine, sodium bicarbonate, or a mixture of an organic acid such as citric acid or a salt thereof and a bicarbonate salt, and the like.

In the resin composition to be supplied to extrusion expansion, a crystal nucleating agent and a crystallization accelerator may be contained, together with the above-mentioned biodegradable resin.

Examples of the above-mentioned crystal nucleating agent include, for example, an organic crystal nucleating agent and an inorganic crystal nucleating agent.

As the above-mentioned crystal nucleating agent, only one of the organic crystal nucleating agent and the inorganic crystal nucleating agent may be employed, or the organic crystal nucleating agent and the inorganic crystal nucleating agent may be used together.

In addition, when only the inorganic crystal nucleating agent is used as the above-mentioned crystal nucleating agent, among inorganic crystal nucleating agents listed later, only one kind may be employed, or two or more kinds may be used together.

Similarly, when only the organic crystal nucleating agent is used as the above-mentioned crystal nucleating agent, among organic crystal nucleating agents listed later, only one kind may be employed, or two or more kinds may be used together.

As the above-mentioned crystal nucleating agent, when the organic crystal nucleating agent and the inorganic crystal nucleating agent are used together, a plurality of kinds may be employed in any one of or both of the organic crystal nucleating agent and the inorganic crystal nucleating agent.

Examples of the above-mentioned inorganic crystal nucleating agent include, for example, talc, tin oxide, smectite, bentonite, dolomite, sericite, feldspar powder, kaolin, mica, montmorillonite, and the like.

From a view point of improvement in crystallization rate, heat resistance, durability, and the like, it is preferable that, among these, the above-mentioned inorganic crystal nucleating agent is talc or tin oxide.

Examples of the above-mentioned organic crystal nucleating agent include, for example, organic amide compounds, organic hydrazide compounds, carboxylic acid ester-based compounds, organic sulfonic acid salts, phthalocyanine-based compounds, melamine-based compounds, organic phosphonic acid salts, and the like.

As the organic sulfonic acid salt, various organic sulfonic acid salts such as a sulfoisophthalic acid salt can be used, and among them, a dimethyl 5-sulfoisophthalate metal salt is preferable, from a view point of a crystallization promoting effect.

Further, a barium salt, a calcium salt, a strontium salt, a potassium salt, a rubidium salt, a sodium salt, and the like are preferable.

Examples of the above-mentioned organic amide compound include, for example, N,N',N''-tricyclohexyltrimesic acid amide, N,N'-ethylenebis(12-hydroxystearic acid) amide, and the like.

The content of the above-mentioned crystal nucleating agent in the above-mentioned resin composition can be, for example, 0.5 part by mass or more, when the content of the above-mentioned biodegradable resin contained in the above-mentioned resin composition is 100 parts by mass.

The content of the above-mentioned crystal nucleating agent in the above-mentioned resin composition is preferably 0.6 part by mass or more, more preferably 0.7 part by mass or more.

The content of the above-mentioned crystal nucleating agent in the above-mentioned resin composition can be, for example, less than 3.0 parts by mass, when the content of the above-mentioned biodegradable resin contained in the above-mentioned resin composition is 100 parts by mass.

The content of the above-mentioned crystal nucleating agent in the above-mentioned resin composition is preferably 2.5 parts by mass or less, more preferably 2.2 parts by mass or less.

Examples of the above-mentioned crystallization accelerator include, for example, phthalic acid derivatives such as di-n-octyl phthalate, di-2-ethylhexyl phthalate, dibenzyl phthalate, diisodecyl phthalate, ditridecyl phthalate, and diundecyl phthalate, isophthalic acid derivatives such as dioctyl isophthalate, adipic acid derivatives such as di-n-butyl adipate and dioctyl adipate, maleic acid derivatives such as di-n-butyl maleate, citric acid derivatives such as tri-n-butyl citrate, itaconic acid derivatives such as monobutyl itaconate, oleic acid derivatives such as butyl oleate, ricinoleic acid derivatives such as glycerin monoricinoleate, phosphoric acid esters such as tricresyl phosphate and trixylenyl phosphate, hydroxy polycarboxylic acid esters such as polyethylene adipate and tributyl polyacrylate acetylcitrate, polyhydric alcohol esters such as glycerin triacetate and glycerin tripropionate, polyalkylene glycol derivatives such as polyethylene glycol and polypropylene glycol, benzyl 2-(2-methoxyethoxy)ethyl adipate, polyglycerin fatty acid ester, and the like.

As the above-mentioned crystallization accelerator, polyglycerin fatty acid ester is preferable.

Examples of the above-mentioned polyglycerin fatty acid esters include, for example, polyglycerin oleic acid ester, polyglycerin ricinoleic acid ester, polyglycerin lauric acid ester, polyglycerin stearic acid ester, polyglycerin condensed ricinoleic acid ester, and the like.

As the above-mentioned crystallization accelerator, among these, it is preferable to employ polyglycerin stearic acid ester.

When the content of the above-mentioned biodegradable resin contained in the above-mentioned resin composition is 100 parts by mass, the content of the above-mentioned crystallization accelerator in the above-mentioned resin composition can be, for example, 0.5 part by mass or more.

The content of the above-mentioned crystallization accelerator in the above-mentioned resin composition is preferably 0.6 part by mass or more, more preferably 0.7 part by mass or more.

When the content of the above-mentioned biodegradable resin contained in the above-mentioned resin composition is 100 parts by mass, the content of the above-mentioned crystallization accelerator in the above-mentioned resin composition can be less than 5.0 parts by mass.

The content of the above-mentioned crystallization accelerator in the above-mentioned resin composition is preferably 4.0 parts by mass or less, more preferably 3.5 parts by mass or less.

Examples of the above-mentioned additive that can be contained in the above-mentioned resin composition include, for example, lubricants, antioxidants, antistatic agents, flame retardants, ultraviolet absorbing agents, light stabilizers, coloring agents, inorganic fillers, and the like.

As described above, the present invention has been exemplified by using the laminated expanded sheet having biodegradability as a preferable embodiment of the present invention, but the laminated expanded sheet of the present invention may not have the biodegradability.

In that case, it is not necessary that a resin constituting the resin expanded layer and the resin non-expanded layer is the biodegradable resin, and for example, polyolefin-based resins such as polyethylene and polypropylene; polystyrene-based resins such as GPPS and HIPS; polyamide-based resins such as polyamide 12 and polyamide 66; polyester-based resins such as polyethylene terephthalate and polybutylene terephthalate; polycarbonate-based resins; and the like can be employed.

In addition, the present invention is not limited to the previously stated exemplifications at all, and the above-mentioned exemplifications can be appropriately modified.

EXAMPLES

The present invention will be more specifically described below by way of Examples, but the present invention is not at all limited to the following exemplifications.

Example 1

As a biodegradable resin for forming a biodegradable resin expanded layer, a biodegradable polyester-based resin (product name "BioPBS FZ91PM" manufactured by PTT MCC Biochem Company) was prepared.

To 100 parts by mass of this biodegradable polyester-based resin was added 2.0 parts by mass of "CROWN TALC" manufactured by Matsumura Sangyo Co., Ltd. as a cell adjusting agent to prepare a resin composition.

In a tandem extruder including a first extruder having a caliber of 50 mm (upstream side) and a second extruder having a caliber of 65 mm (downstream side), the resulting resin composition was supplied to the first extruder having a caliber of 50 mm through a hopper, and heated and melted.

Thereafter, isobutane as a blowing agent was pressed into the first extruder, and melted and kneaded together with the above-mentioned resin composition, to prepare an expandable resin composition with the extruder.

The above-mentioned expandable resin composition in the thermally melted state was flown into the second extruder, a temperature of the expandable resin composition was lowered in the second extruder until it reached a temperature suitable for expansion, and thereafter, the composition was flown into a joining die.

Separately, in order to form a biodegradable resin non-expanded layer, the same biodegradable polyester-based resin (product name "BioPBS FZ91PM" manufactured by PTT MCC Biochem Company) as that used in the above-mentioned biodegradable resin expanded layer was prepared.

This biodegradable polyester-based resin was supplied to a hopper of a single screw extruder having a caliber of 32 mm, and melted and kneaded, and thereafter, the molten kneading product (non-expandable resin composition) was flown into the above-mentioned joining die.

The expandable resin composition and the non-expandable resin composition that had been joined in the joining die were coextruded from a circular die.

Coextrusion was performed from a die slit having a caliber of 70 mm and an interval of 0.7 mm so that a total discharge amount became 40 kg/h, and performed so that an external side became a biodegradable resin non-expanded layer, and an internal side became a biodegradable resin expanded layer.

The coextruded cylindrical expanded sheet was cooled and formed with a cooling mandrel, and thereafter, incised with a cutter attached to a rear part of the cooling mandrel along the extrusion direction, to prepare a long belt-like biodegradable laminated expanded sheet.

Example 2

In the same manner as that of Example 1 except that the resin composition for forming a biodegradable resin non-expanded layer was a mixture of 50 parts by mass of a biodegradable polyester-based resin (product name "BioPBS FZ91PM" manufactured by PTT MCC Biochem Company) and 50 parts by mass of "CROWN TALC" manufactured by Matsumura Sangyo Co., Ltd., a biodegradable laminated expanded sheet was prepared.

Comparative Example 1

In the same manner as that of Example 1 except that the biodegradable resin non-expanded layer was not laminated, a discharge amount at extrusion was 30 kg/h in place of 40 kg/h, and a biodegradable laminated expanded sheet having the monolayer structure of only a biodegradable resin expanded layer was prepared, a biodegradable laminated expanded sheet was prepared.

Comparative Example 2

In the same manner as that of Comparative Example 1 except that a discharge amount at extrusion was 37 kg/h, a biodegradable laminated expanded sheet having the monolayer structure was prepared.

Comparative Example 3

In the same manner as that of Example 1 except that a biodegradable laminated expanded sheet of the three-layer structure in which the biodegradable resin non-expanded layer was provided on both sides of a biodegradable resin expanded layer was prepared, a biodegradable laminated expanded sheet was prepared.

<Formability Assessment>

A biodegradable laminated expanded sheet was thermoformed to prepare a container.

A thickness of a bottom and a thickness of a sidewall of the container were measured, respectively, and a difference thereof was confirmed.

Determination of formability was performed as follows:

◯: A molded article having a good thickness balance between a bottom and a sidewall was obtained.

x: The thickness of a sidewall is small, and the thickness balance of a molded article is bad.

Assessment results of this formability together with other sheet physical properties are shown in Table 1.

TABLE 1

| | Thickness mm | Basis weight g/m² | Apparent density kg/m³ | Open cell ratio % | Average cell diameter mm | Surface roughness (Ra) μm | Bending strength Mpa | Bending elasticity Mpa | Sheet configuration | Formability |
|---|---|---|---|---|---|---|---|---|---|---|
| Example 1 | 1.66 | 682 | 410 | 9 | 0.34 | 4.7<br>1.7 | 5.5 | 244 | Non-expanded/<br>Expanded | ◯ |
| Example 2 | 1.66 | 693 | 420 | 13 | 0.36 | 3.9<br>2.4 | 5.3 | 238 | Non-expanded/<br>Expanded | ◯ |
| Comparative Example 1 | 1.38 | 547 | 400 | 8 | 0.36 | 4.3<br>3.2 | 3.1 | 112 | Expanded | ◯ |
| Comparative Example 2 | 1.61 | 556 | 350 | 8 | 0.33 | 4.6<br>3.0 | 3.0 | 116 | Expanded | ◯ |
| Comparative Example 3 | 1.80 | 676 | 380 | 10 | 0.38 | 1.8<br>1.0 | 5.7 | 277 | Non-expanded/<br>Expanded/<br>Non-expanded | x |

* Numerical values of the surface roughness in Examples 1 and 2 are such that an upper column is a value regarding a biodegradable resin expanded layer, and a lower column is a numerical value regarding a biodegradable resin non-expanded layer.

As is also apparent from the above-mentioned table, according to the present invention, there can be obtained a biodegradable laminated expanded sheet excellent in formability.

What is claimed is:

1. A laminated expanded sheet comprising a laminate of
   a resin expanded layer and
   a resin non-expanded layer,
   wherein said resin expanded layer is provided as an outermost layer,
   said laminated expanded sheet has a bending strength of 5 MPa or more,
   an arithmetic average roughness of a surface formed of said resin expanded layer is 3 μm or more and 6 μm or less,
   a thickness of said laminated expanded sheet is 0.2 mm or more and 4 mm or less, and
   a thickness of said resin non-expanded layer is 1 μm or more and 200 μm or less.

2. The laminated expanded sheet according to claim 1, wherein said resin expanded layer contains a polyester-based resin.

3. The laminated expanded sheet according to claim 2, wherein said polyester-based resin is an aliphatic polyester-based resin.

4. The laminated expanded sheet according to claim 3, wherein said aliphatic polyester-based resin is polybutylene succinate.

* * * * *